(12) United States Patent
Kneidel et al.

(10) Patent No.: US 8,127,905 B2
(45) Date of Patent: Mar. 6, 2012

(54) SERIES DAMPER WITH HYSTERESIS IN ONE DAMPER

(75) Inventors: Craig Kneidel, Massillon, OH (US);
Andre Soto, Tallmadge, OH (US);
Patrick Lindemann, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 674 days.

(21) Appl. No.: 12/288,859

(22) Filed: Oct. 24, 2008

(65) Prior Publication Data

US 2009/0107792 A1 Apr. 30, 2009

Related U.S. Application Data

(60) Provisional application No. 61/000,383, filed on Oct. 25, 2007.

(51) Int. Cl.
*F16H 45/02* (2006.01)
(52) U.S. Cl. ............... 192/3.29; 192/213.2; 192/213.22
(58) Field of Classification Search .......... 192/3.28–3.3, 192/213.2–213.22, 213.1, 213.11, 213.12, 192/213.3, 213.31; 464/68.4, 68.7, 68.8, 464/68.3, 68.5, 64.1, 68.41, 38.41
See application file for complete search history.

(56) References Cited

U.S. PATENT DOCUMENTS

| | | | | |
|---|---|---|---|---|
| 4,347,717 A * | 9/1982 | Lamarche | ............... | 192/213.2 X |
| 4,422,535 A * | 12/1983 | Ling | ............... | 192/3.28 |
| 4,637,500 A | 1/1987 | Göbel et al. | | |
| 4,782,933 A | 11/1988 | Jäckel et al. | | |
| 5,080,215 A | 1/1992 | Förster et al. | | |
| 5,246,399 A * | 9/1993 | Yanko et al. | ........... | 192/213.1 X |
| 5,279,398 A * | 1/1994 | Graton et al. | ............... | 192/3.29 |
| 5,598,745 A * | 2/1997 | Tsuchiya | ............... | 464/68.4 |
| 5,752,884 A * | 5/1998 | Yabe et al. | ............... | 192/3.29 X |
| 5,813,506 A * | 9/1998 | Maeda et al. | ............... | 192/3.29 |
| 6,050,376 A * | 4/2000 | Yabe | ............... | 192/3.29 |
| 6,224,487 B1 * | 5/2001 | Yuergens | ............... | 464/68.41 |
| 6,244,401 B1 | 6/2001 | Maienschein et al. | | |
| 6,439,361 B2 | 8/2002 | Maienschein et al. | | |
| 6,695,110 B2 | 2/2004 | Maienschein et al. | | |
| 7,073,646 B2 * | 7/2006 | Sasse et al. | ............... | 192/3.29 |
| 7,222,706 B2 * | 5/2007 | Tomiyama | ............... | 192/3.29 |
| 7,241,224 B2 * | 7/2007 | Song et al. | ............... | 464/64.1 |
| 7,481,305 B2 * | 1/2009 | Sakai et al. | ............... | 192/3.29 |
| 7,658,679 B2 * | 2/2010 | Avins et al. | ............... | 192/213.1 |
| 7,942,749 B2 * | 5/2011 | Uehara et al. | ............... | 464/68.8 |
| 2007/0131506 A1 * | 6/2007 | Wack et al. | ............... | 192/3.29 |

(Continued)

FOREIGN PATENT DOCUMENTS

DE 3934798 A1 4/1991

(Continued)

*Primary Examiner* — Gregory Binda
*Assistant Examiner* — Matthieu Setliff
(74) *Attorney, Agent, or Firm* — Simpson & Simpson, PLLC

(57) ABSTRACT

A series damper, including: a first damper with a flange and a cover plate; and a second damper with first and second cover plates and a flange. The flange and the cover plate for the first damper are rotationally frictionally engaged and the flange for the second damper rotates free of frictional engagement with the first and second cover plates. The series damper includes a resilient element arranged to cause the frictional engagement of the flange and the cover plate for the first damper. In some aspects, the resilient element is frictionally engaged with the cover plate for the first damper and is arranged to frictionally engage a turbine hub for a torque converter. In some aspects, the resilient element is rotationally connected to the flange for the first damper. In some aspects, the flange for the first damper includes the second cover plate for the second damper.

12 Claims, 4 Drawing Sheets

U.S. PATENT DOCUMENTS

| | | | |
|---|---|---|---|
| 2007/0251788 A1* | 11/2007 | Heck et al. | 192/3.3 |
| 2008/0257675 A1* | 10/2008 | Sasse et al. | 192/3.29 |
| 2009/0108512 A1* | 4/2009 | Soto | |
| 2009/0110475 A1* | 4/2009 | Soto et al. | |
| 2009/0125202 A1* | 5/2009 | Swank et al. | 192/3.28 |
| 2009/0139819 A1* | 6/2009 | Jameson et al. | 192/3.29 |

FOREIGN PATENT DOCUMENTS

| | | | |
|---|---|---|---|
| DE | 10010953 A1 | 9/2000 | |
| FR | 2526907 | 11/1983 | |
| FR | 2579709 | 10/1986 | |
| GB | 2098702 A | 11/1982 | |
| JP | 02118256 A * | 5/1990 | 192/3.29 |

* cited by examiner ated States Patent US 8,127,905 B2

SERIES DAMPER WITH HYSTERESIS IN ONE DAMPER

CROSS-REFERENCE TO RELATED APPLICATIONS

This application claims the benefit under 35 U.S.C. §119 (e) of U.S. Provisional Application No. 61/000,383 filed Oct. 25, 2007 which application is incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a series damper with hysteresis between rotating elements in only one of the component dampers in the series damper.

BACKGROUND OF THE INVENTION

It is known to provide hysteresis forces for both dampers in a series damper. Unfortunately, the prior art does not teach a means for providing a hysteresis force in one damper of a series damper and not in the other damper of the series damper.

Thus, there is a long-felt need to provide a series damper to provide a hysteresis force in only one damper of the series damper.

BRIEF SUMMARY OF THE INVENTION

The present invention broadly comprises a series damper, including: a first damper with a flange and a cover plate; and a second damper with first and second cover plates and a flange. The flange and cover plate for the first damper are rotationally frictionally engaged and the flange for the second damper rotates free of frictional engagement with the first and second cover plates. The series damper includes a resilient element arranged to cause the frictional engagement of the flange and cover plate for the first damper. In some aspects, the resilient element is frictionally engaged with the cover plate for the first damper and is arranged to frictionally engage a turbine hub for a torque converter. In some aspects, the resilient element is rotationally connected to the flange for the first damper. In some aspects, the flange for the first damper includes the second cover plate for the second damper.

In some aspects, the cover plate for the first damper includes at least one slot, the flange for the first damper includes at least one protrusion at least partially disposed in the at least one slot, and there is lash between the cover plate for the first damper and the at least one protrusion in the at least one slot. In some aspects, the frictional engagement between the flange and cover plate for the first damper occurs during windup of the first damper.

In some aspects, the series damper includes an annular element rotationally connected to the flange for the first damper, and the resilient element urges the annular element against the cover plate for the first damper. In some aspects, the resilient element is rotationally connected to the cover plate for the first damper.

It is a general object of the present invention to provide a series damper to provide a hysteresis force in only one damper of the series damper.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
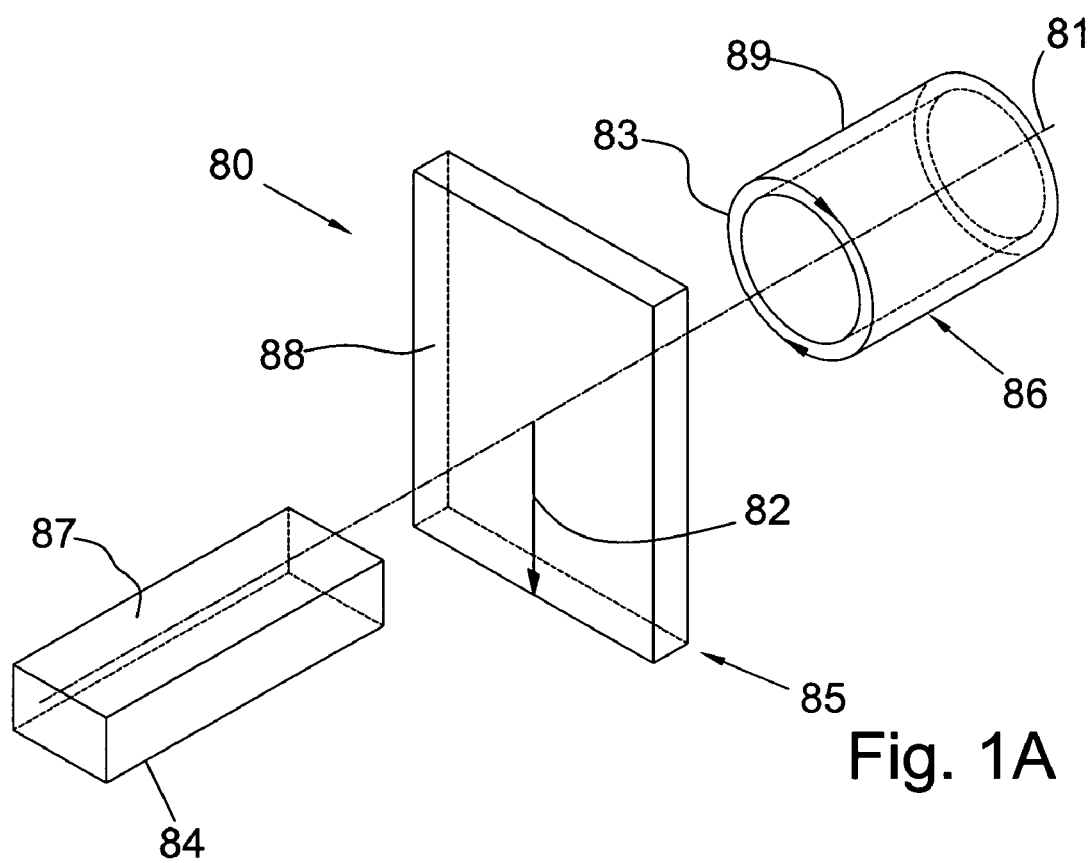
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
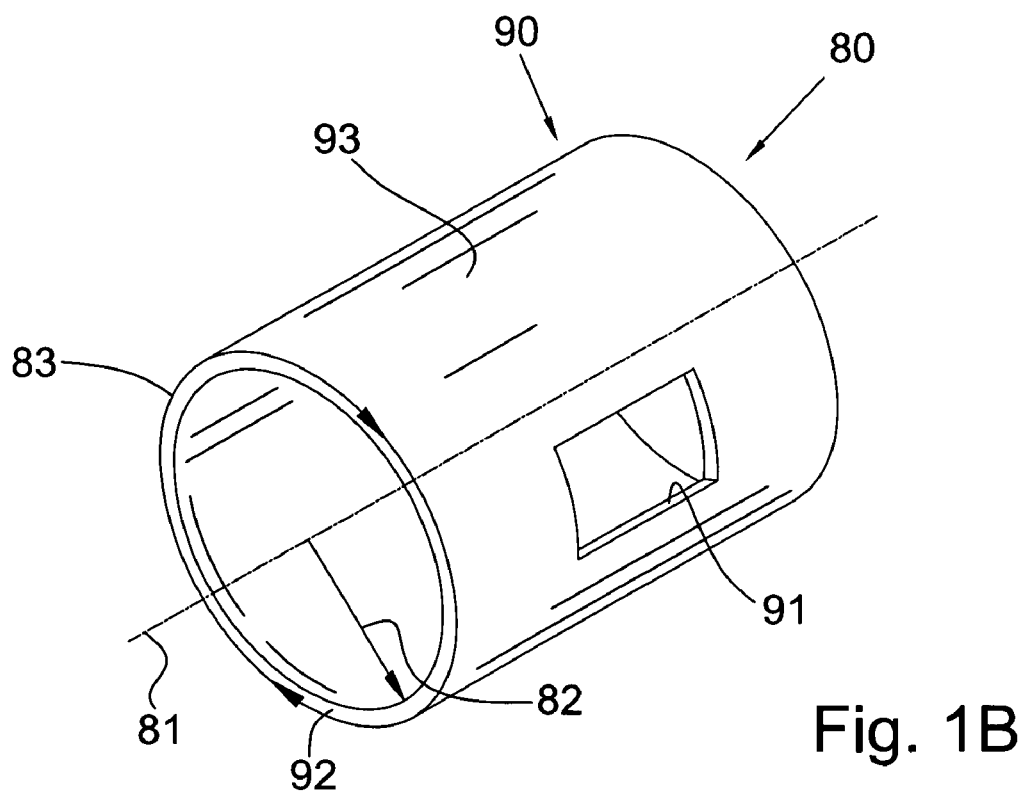
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
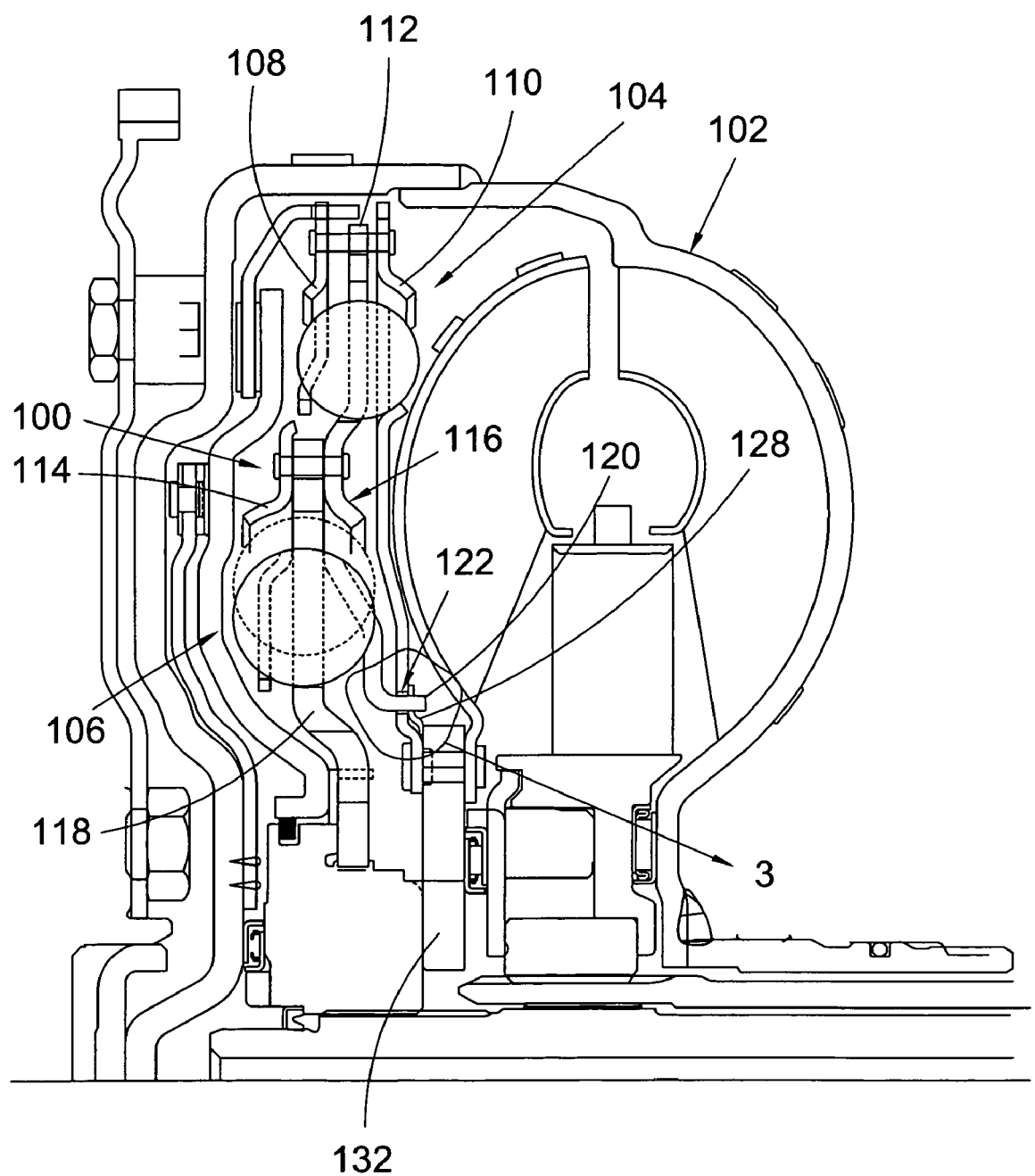
FIG. 2 is a partial cross-sectional view of a present invention series damper in a torque converter.

FIG. 2 is a partial cross-sectional view of present invention series damper 100 in torque converter 102.

Figure 3:
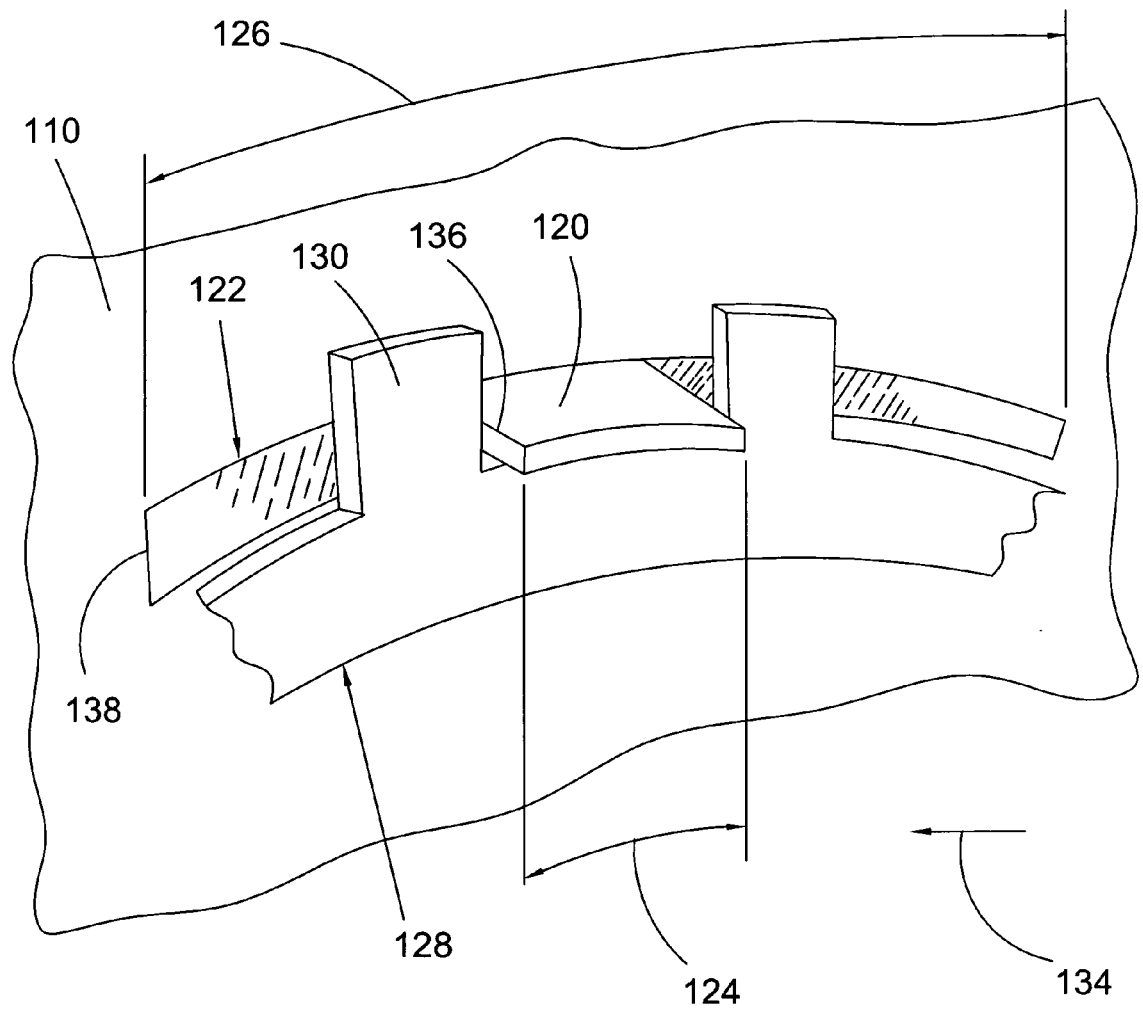
FIG. 3 is a partial perspective detail view of area 3 in FIG. 2.

FIG. 3 is a partial perspective detail view of area 3 in FIG. 2. The following should be viewed in light of FIGS. 2 and 3. Series damper 100 includes dampers 104 and 106. Damper 104 includes cover plates 108 and 110 and flange 112. Damper 106 includes cover plates 114 and 116 and flange 118. Flange 112 and cover plate 116 are continuous. That is, flange 112 includes plate 116 and plate 116 includes flange 112. As further described infra, flange 112 (plate 116) is rotationally frictionally engaged with cover 110. That is, damper 104 includes frictional engagement among the constituent cover plates and flange for damper 104. However, plate 114 and flange 118 rotate substantially free of frictional engagement. For example, flange 118 is not rotationally frictionally engaged with cover plate 114 or plate 116. Thus, as further described infra, hysteresis forces are only applied to damper 104.

In some aspects, cover plate 116 includes at least one axial protrusion 120 disposed in a respective slot 122 in plate 110. The circumferential length 124 of the protrusion is less than the circumferential extent 126 of the slot. That is, there is lash between plate 110 and protrusion 120. Resilient element 128 includes at least one radial protrusion 130 interlocked with protrusions 120. Any resilient element known in the art can be used for element 128. In general, protrusions 120 and 130 rotationally connect plate 116 and the resilient element. By rotationally connect, or secure, we mean that the plate and the resilient element are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra.

Resilient element 128 is preloaded during assembly of torque converter 102 so that the element reacts against plate 110 and turbine hub 132. That is, the element is forced against plate 110 and the hub. As noted supra, length 126 is greater than 124; therefore, plate 116 is partially rotatable with respect to plate 110. For example, plate 116 is rotatable in direction 134 until edge 136 contacts edge 138. This partial rotation occurs during wind-up of damper 104. Thus during wind-up of damper 104, the resilient element provides a hysteresis, or frictional, force between cover 116 (rotationally connected to the resilient element) and cover 110 and between cover 116 and the hub. At the same time, damper 106 operates without rotational friction between plates 114 and 116 and flange 118.

Figure 4:
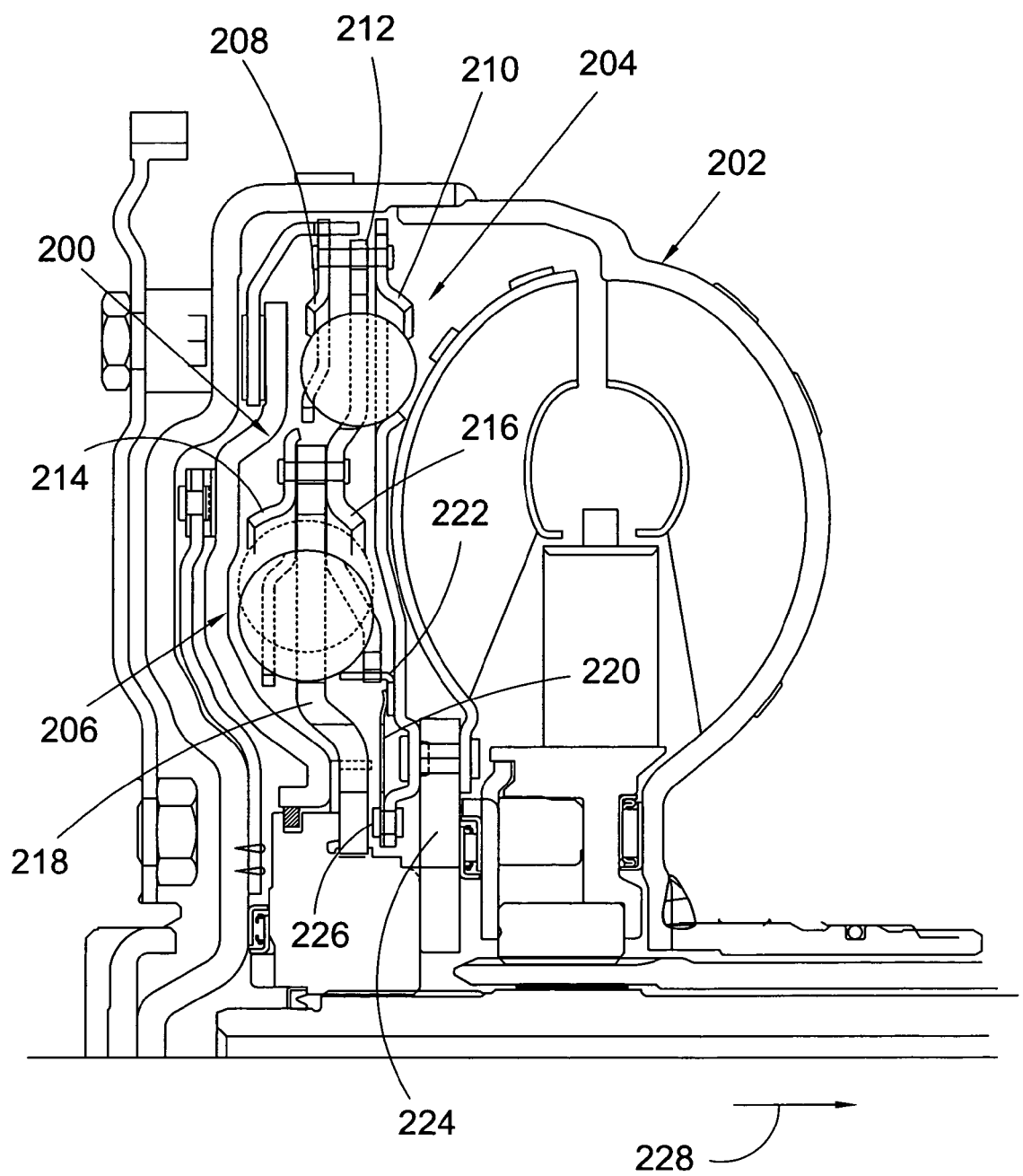
FIG. 4 is a partial cross-sectional view of a present invention series damper in a torque converter.

FIG. 4 is a partial cross-sectional view of present invention series damper 200 in torque converter 202. Series damper 200 includes dampers 204 and 206. Damper 204 includes cover plates 208 and 210 and flange 212. Damper 206 includes cover plates 214 and 216 and flange 218. Flange 212 and cover plate 216 are continuous. That is, flange 212 includes plate 216 and plate 216 includes flange 212. As further described infra, flange 212 (plate 216) is rotationally frictionally engaged with cover 210. That is, damper 204 includes frictional engagement among the constituent cover plates and flange for damper 204. However, plate 214 and flange 218 rotate free of frictional engagement. For example, flange 218 is not rotationally frictionally engaged with cover plate 214 or plate 216. Thus, hysteresis forces are only applied to damper 204.

Damper 200 includes resilient element 220 and ring, or annular, element 222. Any resilient element known in the art can be used for element 220. The ring element is rotationally connected to plate 216 by any means known in the art, for example, splines and slots in plate 216 and the ring element, respectively. However, the ring element can be moved axially with respect to plate 216. In some aspects, the resilient element is fixedly secured to plate 210, which is fixed to turbine hub 224, by any means known in the art, for example, rivets 226. In some aspects (not shown), the resilient element is fixed directly to the hub. The resilient element urges the ring element in direction 228, which brings the ring element into frictional contact with plate 210. Thus, resilient element 220 causes a frictional, or hysteresis, force between flange 212 (plate 216) and plate 210. At the same time, damper 206 operates without rotational friction between plates 214 and 216 and flange 218.

The following should be viewed in light of FIGS. 2-4. In some aspects, the friction in damper 104 or 204 is with respect to an inner cover plate (plates 110 and 210, respectively), that is, the cover plate facing the respective torus for the respective torque converter. In some aspects (not shown), the friction in damper 104 or 204 is with respect to an outer cover plate (plates 108 and 208, respectively), that is, the cover plate facing a respective cover for the respective torque converter.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A series damper, including:
   a lock-up clutch;
   a first damper with a flange, a cover plate, and a spring engaged with the flange and the cover plate; and,
   a second damper with first and second cover plates and a flange, wherein:
   the flange and cover plate for the first damper are rotationally frictionally engaged at a point radially inward of the at least one spring;
   the flange for the second damper rotates free of frictional engagement with the first and second cover plates; and, a torque path from the clutch to the second damper passes through the first damper.

2. The series damper of claim 1 including a resilient element arranged to cause the frictional engagement of the flange and cover plate for the first damper.

3. The series damper of claim 2 wherein the resilient element is frictionally engaged with the cover plate for the first damper and is arranged to frictionally engage a turbine hub for a torque converter.

4. The series damper of claim 3 wherein the frictional engagement between the flange and cover plate for the first damper occurs during windup of the first damper.

5. The series damper of claim 2 wherein the resilient element is rotationally connected to the flange for the first damper.

6. The series damper of claim 2 including an annular element rotationally connected to the flange for the first damper, and wherein the resilient element urges the annular element against the cover plate for the first damper.

7. The series damper of claim 6 wherein the resilient element is rotationally connected to the cover plate for the first damper.

8. The series damper of claim 6 wherein the flange for the first damper includes the second cover plate for the second damper.

9. The series damper of claim 1 wherein the cover plate for the first damper includes at least one slot, the flange for the first damper includes at least one protrusion at least partially disposed in the at least one slot, and there is lash between the cover plate for the first damper and the at least one protrusion in the at least one slot.

10. The series damper of claim 1 wherein the flange for the first damper includes the second cover plate for the second damper.

11. A torque converter, including:
a first damper with a cover plate and a flange;
a second damper with first and second cover plates and a flange, the flange for the first damper including the first cover plate for the second damper;
a turbine hub; and,
a resilient element rotationally connected to the flange for the first damper and frictionally engaged with the cover plate for the first damper and the turbine hub, wherein the flange for the second damper rotates free of frictional engagement with the first and second cover plates.

12. A torque converter, including:
a first damper with a cover plate and a flange;
a second damper with first and second cover plates and a flange, the flange for the first damper including the first cover plate for the second damper;
an annular element rotationally connected to the flange for the first damper; and,
a resilient element rotationally connected to the cover plate for the first damper and urging the annular element against the cover plate for the first damper to frictionally engage the flange and the cover plate for the first damper, wherein the flange for the second damper rotates free of frictional engagement with the first and second cover plates.

* * * * *